United States Patent [19]

Lauritsen et al.

[11] Patent Number: 5,636,480
[45] Date of Patent: Jun. 10, 1997

[54] FACILITY FOR PREPARING AND DEPLOYING SOUNDING DEVICES

[75] Inventors: Dean K. Lauritsen; Sigvard J. Stenlund, both of Boulder, Colo.

[73] Assignee: University Corporation for Atmospheric Research, Boulder, Colo.

[21] Appl. No.: 332,354

[22] Filed: Oct. 31, 1994

[51] Int. Cl.$^6$ .................................................. E04B 1/346
[52] U.S. Cl. ...................... 52/66; 52/72; 244/33
[58] Field of Search ...................... 52/64, 66, 72; 116/210; 244/33, 139, 147

[56] References Cited

U.S. PATENT DOCUMENTS

| | | | |
|---|---|---|---|
| 1,812,955 | 7/1931 | Horni | 244/33 |
| 3,896,595 | 7/1975 | Anghinetti et al. | 52/72 X |
| 3,945,338 | 3/1976 | Correa | 116/210 |
| 4,197,682 | 4/1980 | Schiff et al. | 52/72 |
| 5,140,790 | 8/1992 | Anodglin et al. | 52/72 X |
| 5,257,485 | 11/1993 | Kawaguchi et al. | 52/66 |

OTHER PUBLICATIONS

News letter "Vaisala News", vol. 131, published late 1993, received by Assignee on Jan. 28, 1994, pp. 8–11 and 12–13.

*Primary Examiner*—Creighton Smith
*Attorney, Agent, or Firm*—Duft, Graziano & Forest, P.C.

[57] ABSTRACT

The facility for preparing and deploying atmospheric sounding devices of the present invention, makes use of a structure with a retractable cover and a wind deflecting member circumscribing the shelter, to provide a transportable, reliable, and cost effective facility to prepare and deploy lighter-than-air balloons as the vehicle for carrying sounding devices. The facility permits preparation and deployment in any weather condition including, but not limited to, light to heavy winds that would otherwise cause down drafts through the roof opening in the structure.

21 Claims, 7 Drawing Sheets

FACILITY FOR PREPARING AND DEPLOYING SOUNDING DEVICES

CROSS REFERENCE TO RELATED APPLICATIONS

The following applications titled "LOW COST TELEMETRY RECEIVING SYSTEM, Ser. No. 08/331,808" and "INTEGRATED CONTROL SYSTEM FOR PREPARING AND DEPLOYING SOUNDING DEVICES AND MANAGING TELEMETRY THEREFROM, Ser. No. 08/332, 353" are related to the present application and were each filed on Oct. 31, 1994.

FIELD OF THE INVENTION

This invention relates to sounding systems and, in particular, to a ground based facility for use in preparing and deploying atmospheric sounding devices.

PROBLEM

It is a problem to provide a ground based facility for use in preparing and deploying atmospheric sounding devices where the facility is transportable, reliable, and cost effective. While atmospheric soundings are obtainable by numerous methods, balloons have been the standard vehicles for deploying sounding devices from locations around the world for more than 50 years. However, preparing a balloon and its accompanying sounding device in less than ideal weather can result in a failed deployment as well as equipment damage and/or operator injury. Because coordinated atmospheric soundings by balloon are a primary source of data for monitoring and predicting weather on a global scale, it is important that the soundings occur simultaneously around the world at regular bi-daily intervals. Failing to deploy one balloon can cause gaps in the data collected on a regional scale.

Early techniques for preparing and deploying sounding devices by balloon required two to three individuals working in an open field. Preparing the equipment required one person to prepare the sounding device itself, a second person to hold the balloon, and a third person to inflate the balloon and secure the sounding device to the balloon by a tether. Deploying the sounding device then required two persons to stabilize and then release the balloon, and a third person to run along behind the balloon with the sounding device in hand until the balloon reached a height equal the length of the tether in order to prevent damaging the sounding device if it were to bounce or be dragged along the ground. Such preparation and deployment techniques are prone to many failures and are too labor intensive for the present day given that each location around the world deploys at least two balloons per day.

More recent techniques for preparing and deploying sounding devices by balloon include a simple shelter where the balloon inflation and sounding device preparation is completed inside the shelter. Deploying the sounding device, however, required up to three persons as previously described. Two persons stabilized the balloon once outside the shelter and then released the balloon, while a third person ran along behind the balloon with the sounding device in hand until the balloon reached a height equal the length of the tether in order to prevent damaging the sounding device if it were to bounce or be dragged along the ground.

The most recent technique for preparing and deploying sounding devices by balloon also includes a simple shelter where the balloon inflation and sounding device preparation is completed inside the shelter, and the sounding device is deployed by releasing the balloon through an opening in the shelter's roof. This technique, however, may require up to two persons. A first person held a balloon, while a second person inflated the balloon, prepared a sounding device and attached the sounding device to the balloon by a tether, and opened the shelter's roof. The first person released the balloon while the second person held the sounding device so that it cleared the roof opening. However, similar to the previously described deployment techniques, the present technique is labor intensive and requires at least two persons to prepare and deploy a balloon. Further, when releasing the balloon through the shelter's roof in less than calm weather, wind passing across the shelter's roof creates a downdraft into the opening in the shelter's roof, thereby preventing the balloon from rising through the opening. The downdraft causes the balloon to experience extreme distortion and requires someone to push on the balloon from within the shelter so that the balloon clears the shelter. The forces from pushing the balloon out the opening, coupled with balloon distortion resulting from the downdraft, typically cause the balloon to rupture. Finally, these present preparation and deployment techniques do not condition the balloon or the sounding device to ambient air conditions which cause additional stress on the balloon and provides faulty sounding device readings at lower altitudes prior to becoming fully acclimated.

SOLUTION

The above described problems are solved and a technical advance achieved in the field by the facility for use in preparing and deploying sounding devices. The present invention requires only one person to prepare and deploy a sounding device tethered to a balloon. The facility includes manually and/or automated features including, but not limited to, a structure having a retractable cover over the overhead opening in the structure's roof, a hands free balloon restraint, an external sounding device cradle with automatic antenna deployment feature, and a conditioning system that allows the balloon and sounding device to adjust to ambient atmospheric conditions without opening the retractable overhead cover. Further, once the balloon is prepared and restrained within the facility, unattended remote balloon deployment is possible by automatic operation of the retractable overhead cover and balloon restraint release device.

Finally, a wind deflector around the perimeter of the facility provides sufficient wind deflection to allow the balloon to rise unassisted and undamaged through the overhead opening. Further, when the retractable overhead cover is in its fully retracted position, the cover itself forms a portion of the wind deflector in a compact and efficient fashion. Where additional extension facilities are attached to the preparation and deployment facility, the wind deflector continues around the perimeter of the extension facilities as well. The extension facilities may house balloon and sounding device supplies, electronic equipment for tracking the sounding device, and/or living quarters as needed.

DETAILED DESCRIPTION

Preparation and Deployment Facility

Figure 1:
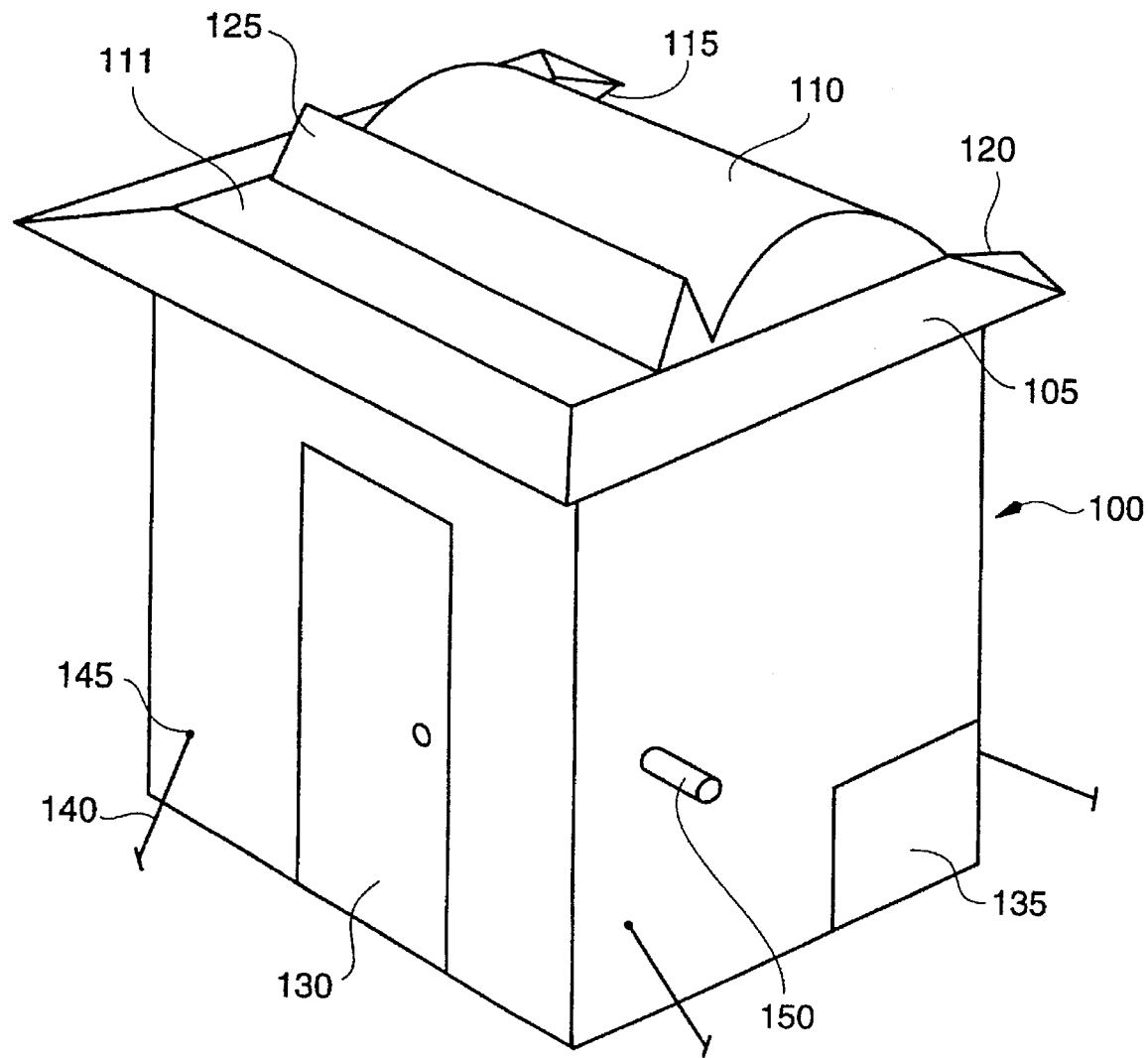
FIGS. 1 and 2 illustrate the facility for use in preparing and deploying sounding devices.

FIG. 1 illustrates a stand-alone sounding device preparation and deployment facility. The basic structure 100, in the preferred embodiment, has a rectangular foundation, four rectangular side walls, and a substantially flat roof 111. The structure's foundation may also be any other shape including, but not limited to, circular, curvilinear or polygonal. The relative dimensions of the foundation, sidewalls, and roof, and the overall architecture of this or any other structure illustrated herein, serves only as an example, not as a limitation. A wind deflector 105 circumscribes the perimeter of the roof and serves to divert the wind away from the roof 111 opening (not shown) in a manner that creates a low pressure area over the roof 111 area. A substantially rectangular and retractable cover 110 is shown in its closed position so that it seals the roof 111 opening (not shown). In the preferred embodiment, the retractable cover 110 contains sufficient slope or curvature so that rain, snow, and/or ice do not collect in any significant quantity so that the retracting mechanism, whether manual or automatic, is not burdened to the point of being unable to properly retract the cover 110. A wind deflector shaped portion 125 is attached to the retractable cover 110. The deflector shaped portion 125 is as wide as the fixed length wind deflector gap between points 115 and 120 so that the portion 125 can fill the wind deflector gap when the retractable cover 110 is fully retracted. In the preferred embodiment, the wind deflector 105 is substantially wedge shaped as illustrated by 460 and 461 in FIG. 4. The deflector 105 is attached at the roof 111 line 464 of the structure 100 so that the narrow portion 463 is directed away from the structure 100 and the flat edge 462 opposite the acute angle formed by edges 460 and 461, is vertically attached to the structure 100 between edge 464 and edge 465. The wind deflector preferably circumscribes the entire structure. Alternatively, the deflector 105 may be attached only to the portion of the structure exposed to wind. A shelter access door 130 provides operator access to structure 100. A mechanical access panel 135 provides access to the mechanism for the retractable cover 110 and shelters the mechanism from external elements including moisture and dust. A guy wire 140 is attached between guy wire eyelet 145 and the surface supporting the shelter 100, to secure the structure in high wind conditions. An ambient air intake 150 allows external air to enter the structure and can be located on any side wall or the roof as a matter of design choice.

Figure 2:
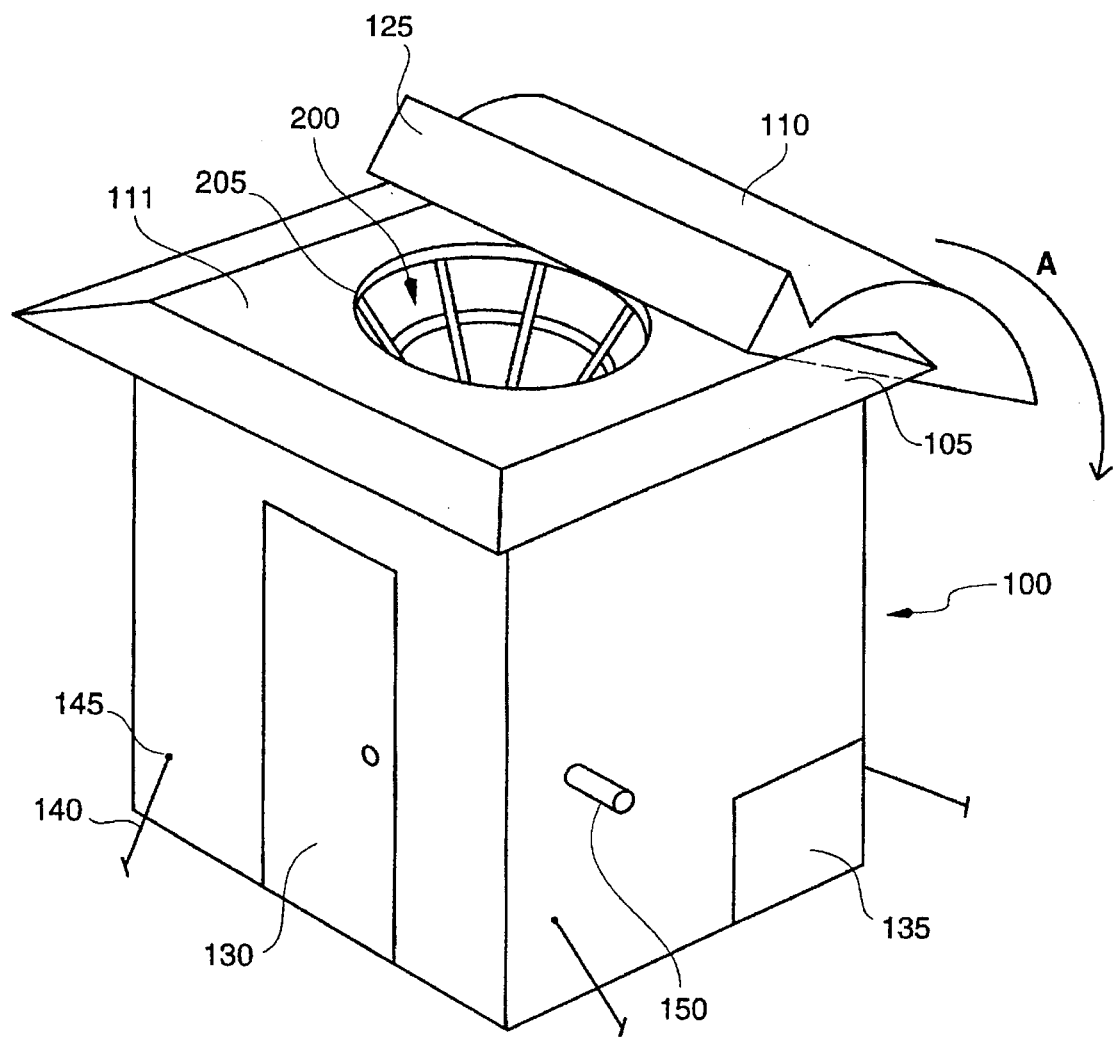
Figure 5:
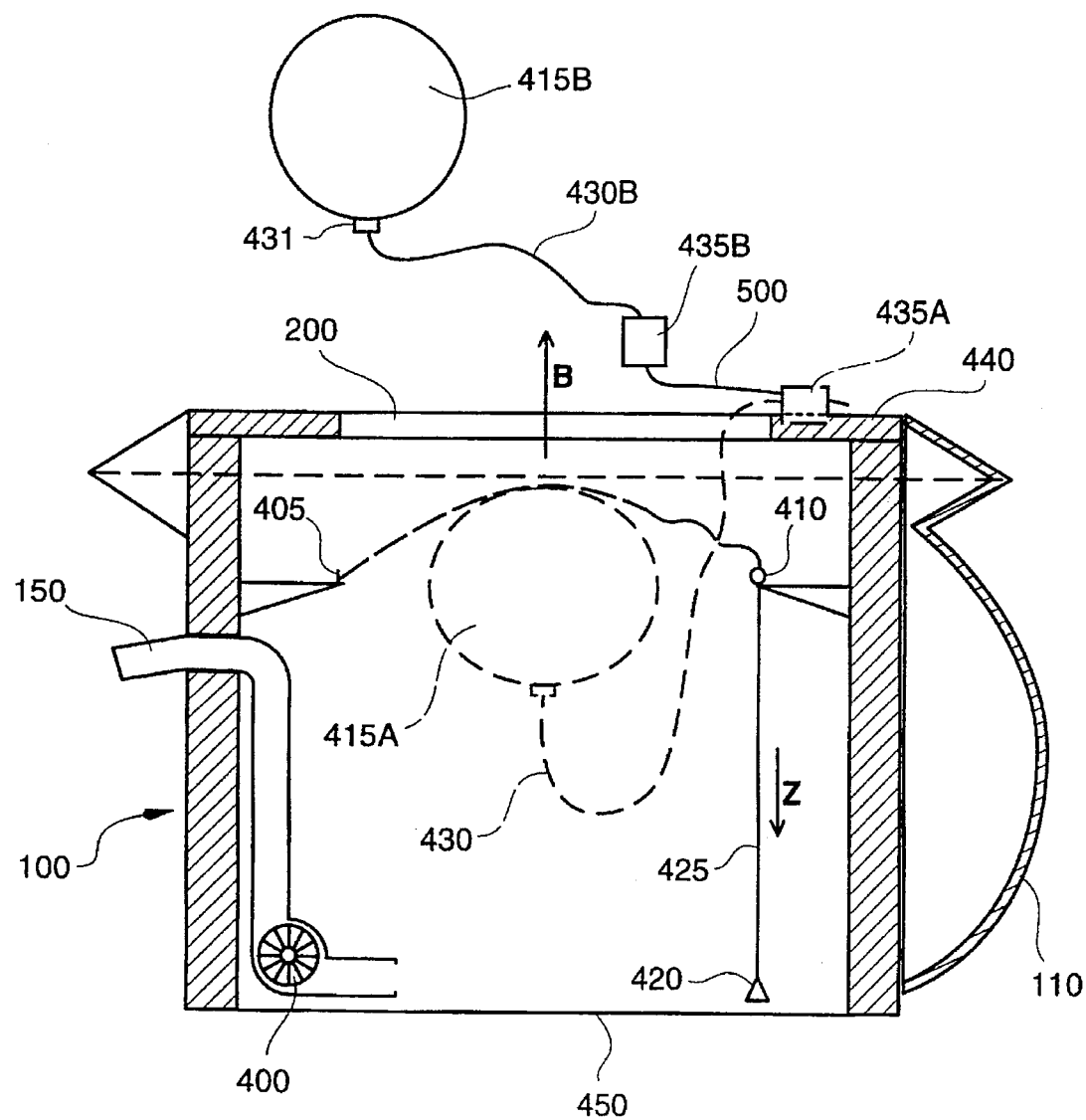
Figure 6:
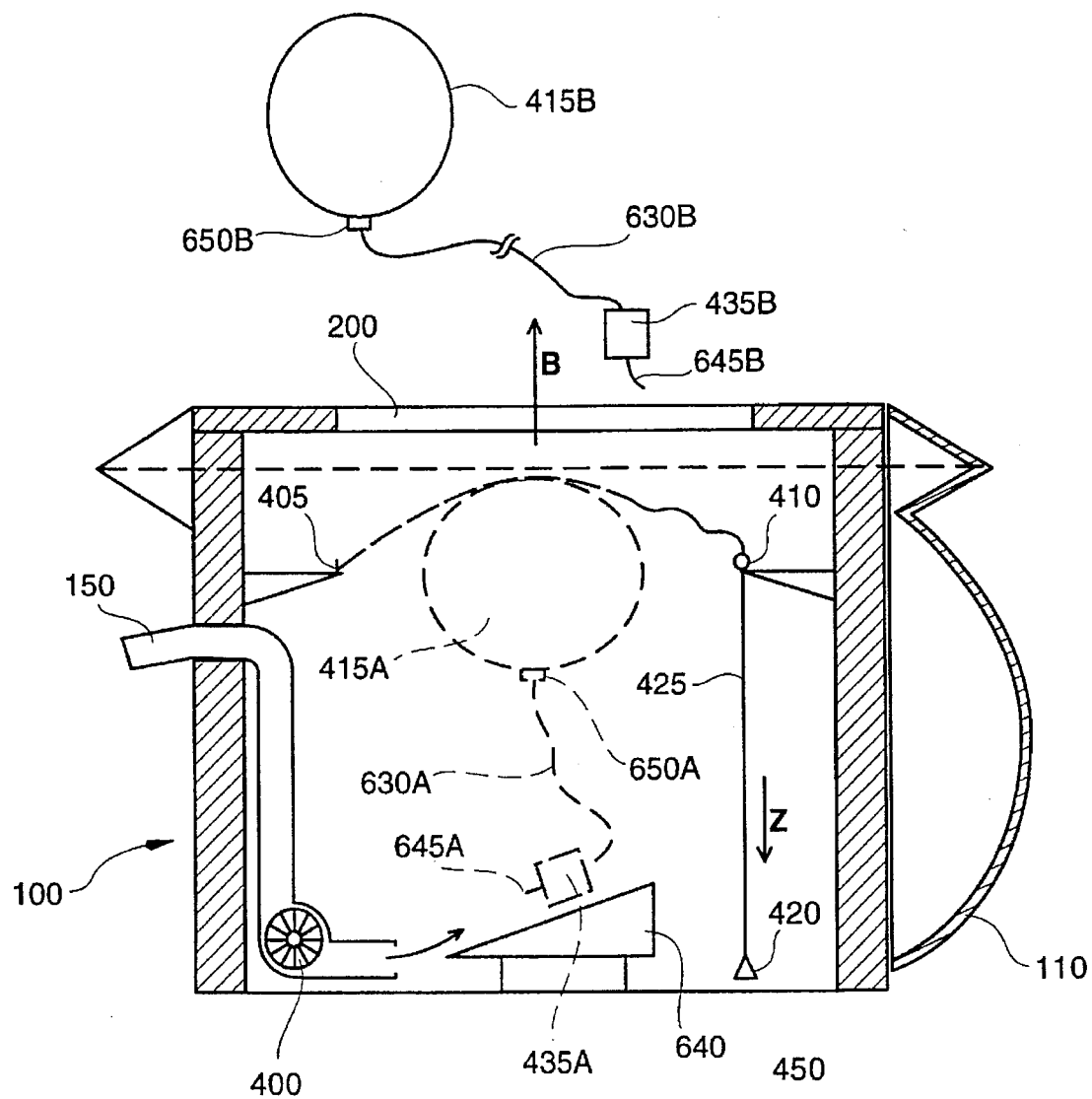
FIG. 6 illustrates a preferred facility for use in preparing and deploying sounding devices.

FIG. 2 illustrates the same structure 100 shown in FIG. 1. In FIG. 2, however, the retractable cover 110 is moving in direction "A" from the closed position shown in FIG. 1 to an open position that reveals roof opening 200. External elements are kept from entering the roof opening 200 by a sealing edge 205. FIGS. 5 and 6 illustrate the retractable cover 110 in its fully retracted position so that the wind deflector portion 125 completes the circumscribing wind deflector 105 along the roof perimeter of structure 100.

Figure 3:
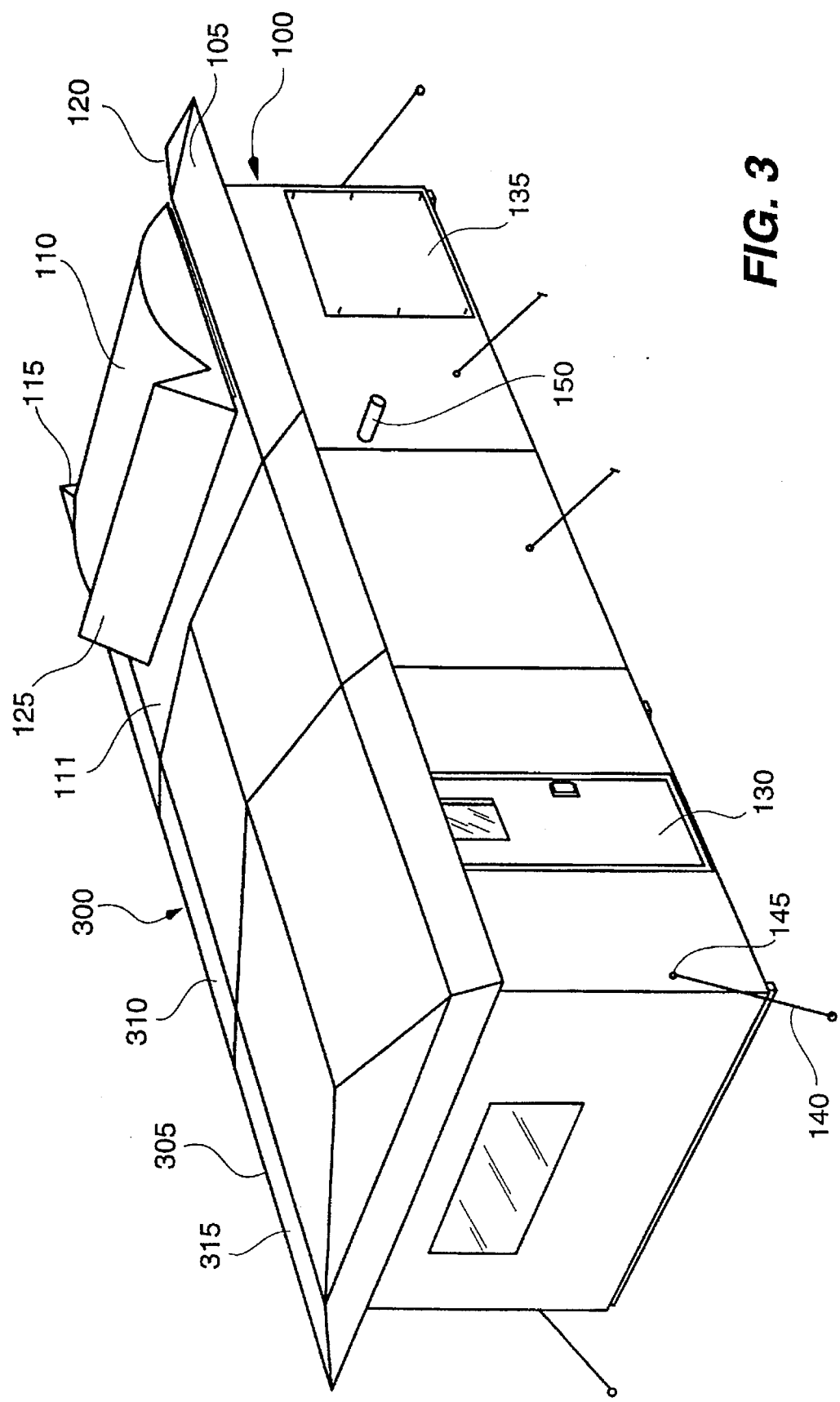
FIG. 3 illustrates the facility for use in preparing and deploying sounding devices with detachable extension facilities.

FIG. 3 illustrates the basic structure 100 used for preparing and deploying sounding devices shown in FIGS. 1 and 2, along with a first extension shelter 300 and a second extension shelter 305. Each extension shelter 300 and 305 have extension wind deflector sections 310 and 315 to complete the circumscribing wind deflector 105 along the roof perimeter of the entire extended structure made of 100, 300, 305. The extension shelters are useful to house electronic equipment used to monitor a deployed sounding device and/or for computing equipment used to control preparation and deployment. A portion of an extension structure may also be used for miscellaneous equipment storage or operator quarters. In the preferred embodiment, the extended structure made of 100, 300, 305 is of a sufficiently modular design so that the shelter access door 130 can be moved from its location on structure 100 in FIG. 1, to its location on the second extension shelter 305 in FIG. 3. Similarly, other features such as the ambient air intake 150 may be moved as a matter of design choice. As an alternative, the rectangular foundation illustrated in FIG. 3 may be "L" or "T" shaped as a matter of design choice provided the wind deflector 105 circumscribes the entire structure. Structures with non-rectangular foundations, however, may experience varied results depending on the structure's orientation with respect to existing wind conditions. To counter unexpected wind patterns or quartering winds around structures with non-rectangular foundations, the wind deflector itself or a secondary wind deflector may be required around the roof opening 200.

Preparation and Deployment

Figure 4:
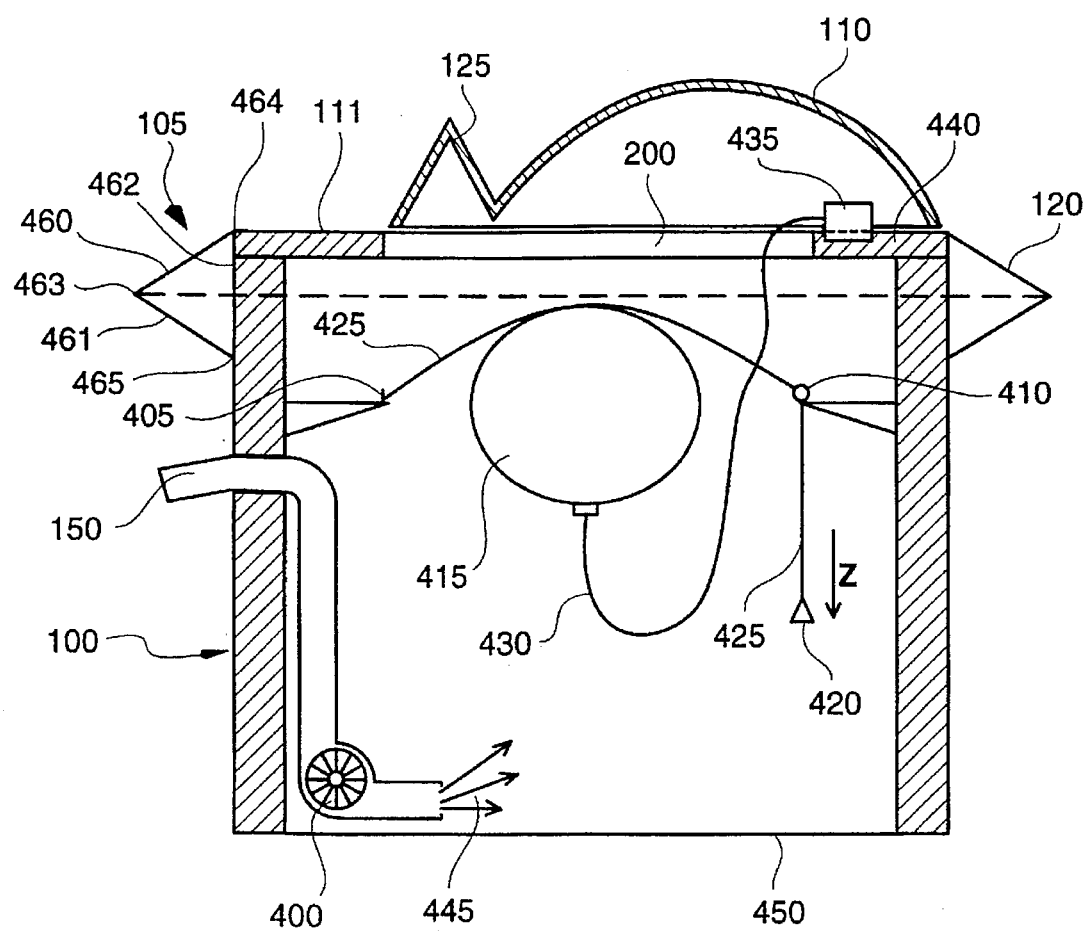
FIGS. 4 and 5 illustrate a cross sectional view of the preparation and deployment of a balloon and sounding device.

FIGS. 4 and 5 illustrate a balloon and sounding device in the preparation stage and the deployment stage. FIG. 4 illustrates a balloon 415 and sounding device 435 as it appears in a cross-sectional view within structure 100 fully prepared and ready to deploy. The preparations are typically completed with the retractable cover 110 in its closed position sealing roof opening 200. To condition the balloon 415 and sounding device 435 to ambient atmospheric conditions external to structure 100 while the retractable cover 110 is closed, a manual or automated ambient air circulator 400 circulates external ambient air 445 drawn from the ambient air intake 150, throughout structure 100. This conditioning allows the equipment to adjust to external temperature and humidity, for example, so that the initial reading by sounding device 435 is accurate immediately upon deployment. Without this conditioning, valuable sounding data is lost as the sounding device reaches an equilibrium with external conditions. The conditioning may occur just prior to deployment or at any time during preparation for deployment as desired. Further, as external conditions permit, the conditioning may occur without operating the ambient air circulator 400, by simply retracting the retractable cover 110. In the preferred embodiment, ambient air circulator 400 is oriented to blow directly onto sounding device 435.

Prior to inflating balloon 415, a balloon restraint 425 is placed between restraint anchor points 405 and 410 to hold the balloon in place within structure 100. Materials for the balloon restraint 425 may include, but are not limited to, a single wide strap, webbing, or two or more crossing straps as a matter of design choice. The present example illustrates a single strap sufficiently wide so that it secures the balloon by covering the balloon's crown. The balloon restraint 425 is designed to hold the balloon 415 in place during preparation with or without the retractable cover 110 covering roof opening 200. A second function of the restraint 425 is to release the balloon at the time deployment is desired. Restraint anchor 405 includes a release mechanism that firmly grasps one end of the balloon restraint 425 until it is triggered to release the restraint. Restraint anchor 410 includes a take-up mechanism to quickly withdraw the restraint 425 allowing the balloon 415 to rise undamaged. The take-up mechanism in the preferred embodiment includes a pulley or pass-through eyelet at anchor point 410 and a weight 420 suspended from the free end of the restraint 425. To release balloon 415, the release mechanism at anchor point 405 releases restraint 425 allowing weight 420 to fall in direction "Z" toward floor 450, thereby freeing the balloon 415.

A sounding device 435 is connected to the balloon 415 by extendable tether 430 that is initially only a few feet in length, preferably one foot or less. Following any necessary preparation, the sounding device is placed in a cradle 440 located outside and adjacent to the opening 200 and within the protection of the retractable cover 110 when the cover is in its closed position. Cradle 440 also serves as a sounding device antenna anchor. Locating sounding device 435 in the cradle 440 with an initially shortened tether allows the balloon 415 to rise through opening 200 while trailing the tether 430 without the tether 430 or sounding device 435 becoming entangled within structure 100 or roof opening 200. Once clear of structure 100, a letdown device 431 releases an additional length of 50 to 150 feet of tether spooled therein.

FIG. 5 illustrates the cross-sectional perspective discussed for FIG. 4, in addition to a perspective of the deployed sounding device. As in FIG. 4, the balloon 415a is restrained by the balloon restraint 425 which is anchored between anchor point 405 and 410. To deploy a sounding device, the retractable cover 110 is fully retracted to uncover opening 200. The release mechanism at balloon anchor point 405, then releases the balloon restraint 425 so that a counter weight 420 falls in direction "Z" to the floor 450 of structure 100, thereby releasing the balloon 415a. The balloon rises through opening 200 and beyond in direction "B", as illustrated by balloon 415a and 415b. The shortened tether trails the balloon from position 430a to 430b. When the shortened tether 430b reaches its maximum length, the attached sounding device rises from position 435a to 435b and beyond. Trailing the sounding device at 435b is an antenna 500 which is attached between the sounding device 435b and an antenna anchor point in cradle 440. As the sounding device 435b rises from cradle 440, the antenna 500 is deployed to its maximum length and then detaches from antenna anchor point in cradle 440 so that it hangs freely below sounding device 435b. Depending on the specific type antenna and whether the antenna is for transmitting or receiving, a permanently deployed antenna such as 645 in FIG. 6 may be preferable over the deployable antenna 500. Further, it is well known in the art to have a deployable Navaid antenna integrated with the tether 430 for receiving a signal and a separate telemetry transmitting antenna permanently deployed at the bottom of the sounding device as shown in antenna 645 of FIG. 6.

FIG. 6 illustrates a preferred alternative embodiment where the sounding device 435 is attached to the balloon 415 by an extendable tether 630, and the sounding device antenna 645 is permanently extended prior to deployment.

As previously discussed, the balloon 415a is initially prepared and restrained by balloon restraint 425 which is anchored between anchor point 405 and 410. The sounding device in position 435a however, is prepared on a sonde cradle 640 that is located on the structure's floor 450. The sonde cradle 640 is positioned so that the ambient air blower 400 can bring in ambient air through ambient air intake 150 and blow the air directly onto the sounding device in position 435a. Blowing directly onto the sounding device conditions the device much more quickly than blowing ambient air generally into the entire structure 100.

The sounding device in position 435a is attached to balloon 415a by an extendable tether 630a that is initially one foot in length or less. The purpose of the initially shortened tether is to carry the sounding device closely to the balloon as it rises through opening 200 thereby preventing the device from becoming entangled.

The shortened tether 630a, however, is not desirable once the balloon has cleared the structure 100, because the balloon can rock back and forth in flight, thereby creating a pendulum affect that can violently shake and damage the sounding device or burst the balloon due to the sounding device 435 or its antenna 645 coming in contact with the balloon. Therefore, a letdown device 650a is attached between the neck of balloon 415a and sounding device 435a with an additional length of 50 to 150 feet of tether spooled therein. Once the balloon reaches a position 415b well clear of structure 100, the letdown device at 650b begins releasing the additional spooled tether 630b. The length of a fully extended tether will vary depending on the balloon payload requirements. In practice, the longer tether dampens the affect of balloon movement on the sounding device thereby greatly reducing the risk of damaging the sounding device or bursting the balloon. These reasons apply equally to the embodiments in FIG. 5 and 6.

Letdown devices such as 650 are well known in the art. The type of trigger causing the letdown device to release the spooled tether may vary widely from setting an electronic or mechanical timer, to physically pulling a release pin by way of a 5 to 15 foot anchor line attached between the outside of the structure and the letdown device.

Wind Deflection

Figure 7:
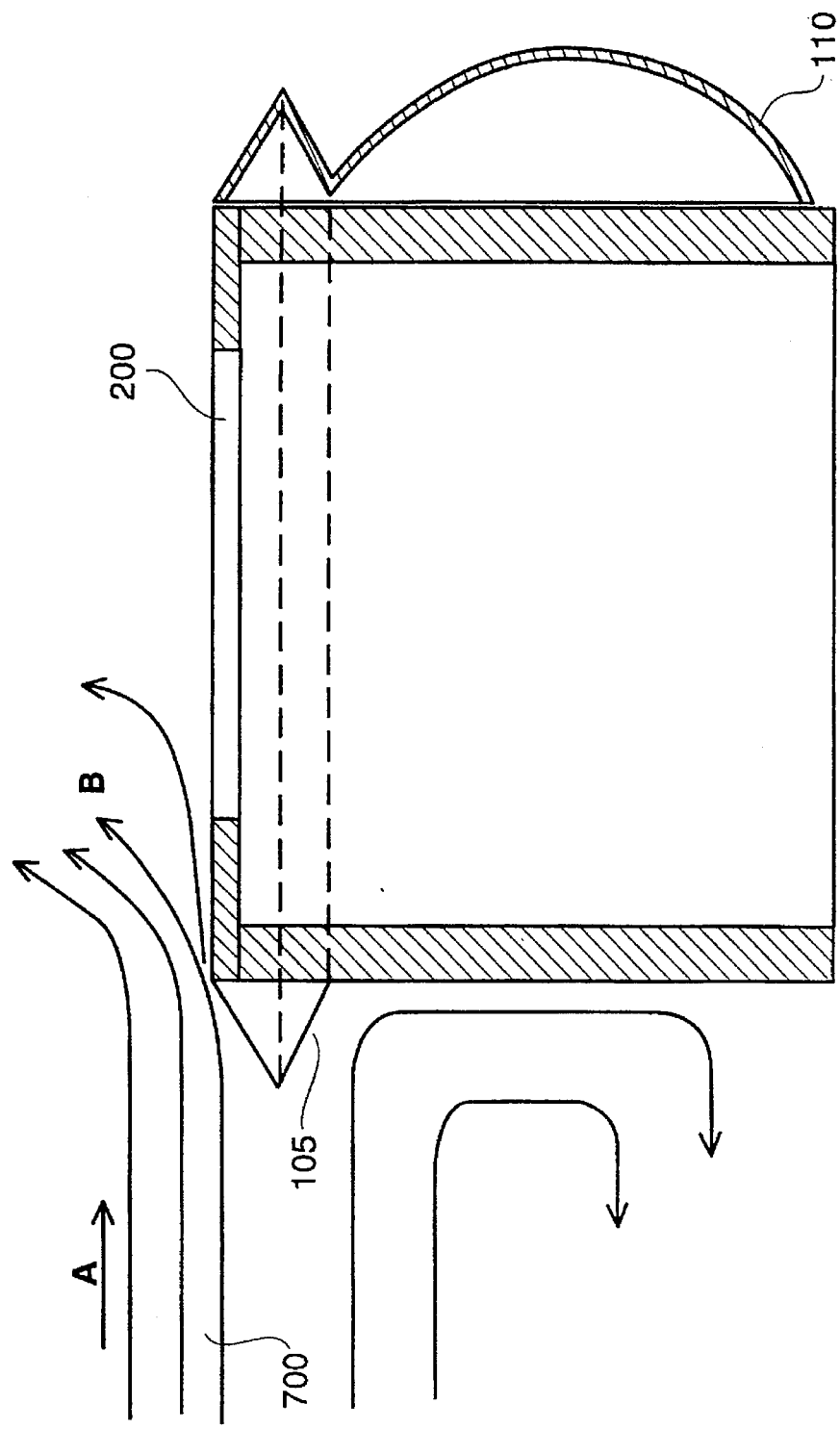
FIG. 7 illustrates the wind deflection in operation.

FIG. 7 illustrates the affect of wind deflector 105 on wind 700 as it approaches structure 100 in direction "A". The wind deflector 105 forces the wind 700 to pass across and upward away from opening 200 in direction "B". Absent the wind deflection, wind will pass directly across and cause a down draft into roof opening 200 thereby preventing a balloon from rising freely through opening 200. In the preferred embodiment, the wind deflector extends as much as 2 feet from structure 100 forming a shallow angle of 45 degrees or less at the wind breaking edge of the deflector.

Summary

The facility for use in preparing and deploying sounding devices provides a sheltered enclosure for preparing the sounding equipment, in addition to a wind deflector to ensure a successful deployment in less than ideal weather and/or wind conditions. While specific embodiments of this invention are disclosed herein, it is expected that those skilled in the art can and will design alternate embodiments of this invention that fall within the scope of the following claims.

We claim:

1. A facility for use in preparing and deploying a sounding device and sounding device vehicle, said facility comprising:

a structure having an opening therein, said opening providing a means for deploying said sounding device via said sounding device vehicle from within said structure;

a cover movable between a first position wherein said cover seals said opening and a second position wherein said cover exposes said opening; and means for deflecting wind that approaches said opening from any direction substantially horizontal with said opening in a direction that is upward and away from said opening when said cover is in said second position, wherein part of said cover forms an integral and uniform portion of said means for deflecting wind when said cover is in said second position.

2. A facility according to claim 1 wherein said means for deflecting wind includes:

a substantially wedge shaped member having a first surface at an acute angle with a second surface and a third surface opposite said acute angle joining said first surface and said second surface, said third surface of said substantially wedge shaped member being vertically attached along a substantial portion of a roofline of said structure.

3. A facility according to claim 2 wherein said substantially wedge shaped member includes:

a first external edge comprising an intersection of said first surface and said third surface wherein said first external edge is adjacent a perimeter of said roofline; and a second external edge comprising an intersection of said second surface and said third surface wherein said second external edge is below said perimeter of said roofline.

4. A facility according to claim 1 further comprising:

means for controllably conditioning said sounding device vehicle and said sounding device with external ambient atmospheric conditions existing at a deployment site, wherein said means for controllably conditioning occurs with said cover in said first position, so that said sounding device vehicle and said sounding device are intended to gradually approach an equilibrium with said external ambient atmospheric conditions.

5. A facility according to claim 1 further comprising:

means for restraining said sounding device vehicle within said structure by a restraining device other than said cover in said first position.

6. A facility according to claim 1 further comprising:

at least one extension structure adjacent to said structure and accessible from within said structure for housing equipment and personnel.

7. A facility according to claim 1 further comprising:

means for preparing said sounding device vehicle and said sounding device within said structure with said cover in said first position.

8. A facility according to claim 1 further comprising:

means for preparing said sounding device vehicle and said sounding device within said structure with said cover in said second position.

9. A facility according to claim 1 further comprising:

means for releasing said sounding device vehicle from within said structure with said cover in said second position.

10. A method of using a facility of preparing and deploying a sounding device and a sounding device vehicle comprising the steps of:

moving a cover over an opening in a structure between a first position wherein said cover seals said opening and a second position wherein said cover exposes said opening;

deflecting wind away from said opening when said cover is in said second position; and releasing said sounding device via said sound device vehicle from within said structure when said cover is in said second position.

11. A method according to claim 10 wherein said step of deflecting includes the step of:

mounting a substantially wedge shaped member, said wedge shaped member having a first surface at an acute angle with a second surface and a third surface opposite said acute angle joining said first surface and said second surface, along a substantial portion of a roofline of said structure so that said third surface is vertical.

12. A method according to claim 11 wherein said step of mounting includes the steps of:

mounting a first external edge comprising an intersection of said first surface and said third surface wherein said first external edge is adjacent the perimeter of said roofline; and mounting a second external edge comprising an intersection of said second surface and said third surface wherein said second external edge is below the perimeter of said roofline.

13. A method according to claim 10 wherein said step of moving includes:

forming a portion of said wind deflector with said cover when said cover is in said second position.

14. A method according to claim 10 further comprising the steps of: conditioning said sounding device vehicle and said sounding device with external ambient atmospheric conditions existing at a deployment site, whereby said sounding device vehicle and said sounding device approach an equilibrium with said external ambient atmospheric conditions.

15. A method according to claim 14 including the step of:

conditioning said sounding device with said cover in said first position.

16. A method according to claim 10 further comprising the step of:

restraining said sounding device vehicle within said structure prior to deployment.

17. A method according to claim 10 further comprising the step of:

attaching at least one extension structure adjacent to said structure so that said at least one extension structure is accessible from within said structure.

18. A method according to claim 10 further comprising the step of:

preparing said sounding device vehicle and said sounding device within said structure with said cover in said first position.

19. A method according to claim 10 further comprising the step of:

preparing said sounding device vehicle and said sounding device within said structure with said cover in said second position.

20. A method according to claim 10 further comprising the step of:

releasing said sounding device vehicle from within said structure with said cover in said second position.

21. A facility for preparing and deploying a sounding device and a sounding device vehicle, said facility comprising:

a structure having a roof, an opening in said roof, and at least one substantially rigid sidewall; and means for deflecting wind away from said opening for said sounding device vehicle to unassistedly pass through said opening from within said structure, wherein part of said cover forms a uniformly integrated portion of said means for deflecting wind when said cover is in said second position.

* * * * *